(12) United States Patent
Tomizawa et al.

(10) Patent No.: US 6,224,971 B1
(45) Date of Patent: May 1, 2001

(54) INK-JET RECORDING SHEET AND LIQUID COATING COMPOSITION THEREFOR

(75) Inventors: Tadashi Tomizawa, Koshigaya; Sachiko Suzuki, Soka; Kuniaki Fukuhara; Naoki Sakazume, both of Koshigaya, all of (JP)

(73) Assignee: Somar Corporation, Tokyo (JP)

( * ) Notice: Subject to any disclaimer, the term of this patent is extended or adjusted under 35 U.S.C. 154(b) by 0 days.

(21) Appl. No.: 09/017,620

(22) Filed: Feb. 2, 1998

(30) Foreign Application Priority Data

Feb. 10, 1997 (JP) .................................................. 9-026413
Mar. 31, 1997 (JP) .................................................. 9-080971

(51) Int. Cl.$^7$ ........................................................ B41M 5/00
(52) U.S. Cl. ......................... 428/331; 428/195; 428/409; 428/500; 428/522
(58) Field of Search ...................................... 428/195, 331, 428/409, 500, 522

(56) References Cited

FOREIGN PATENT DOCUMENTS 61-188183   8/1986   (JP).

*Primary Examiner*—Pamela R. Schwartz
(74) *Attorney, Agent, or Firm*—Wenderoth, Lind & Ponack, L.L.P.

(57) ABSTRACT

Proposed are novel ink-jet recording sheet having high water resistance, excellent transparency of the ink-receptive layer, ink absorptivity and color developability as well as the advantages of absence of surface tackiness and blocking and a liquid coating composition for forming the ink-receptive coating layer of the recording sheet. The liquid coating composition comprises, as a uniform blend in an aqueous medium:

(A) an acetoacetylated polyvinyl alcohol;
(B) a polyvinylpyrrolidone resin; and
(C) an acidic aqueous dispersion of a colloidal silica, each in a specified weight proportion, in a limited weight proportion.

8 Claims, No Drawings

INK-JET RECORDING SHEET AND LIQUID COATING COMPOSITION THEREFOR

BACKGROUND OF THE INVENTION

The present invention relates to an ink-jet recording sheet and a liquid coating composition for forming a recording layer to prepare an ink-jet recording sheet. More particularly, the invention relates to a liquid coating composition suitable for forming, on the surface of a substrate sheet, an ink-receptive layer for ink-jet recording having high water resistance, excellent transparency, good ink absorptivity and good color developability as well as little stickiness not to cause a disadvantageous phenomenon of blocking of sheets.

It is a widely practiced convenient procedure in recent years to prepare posters and other printed materials for presentation by printing out patterns and images formed and stored in computer memories by utilizing a printer operated by the computer along with increasing prevalence of the computer technologies. The printers employed in these technologies include dot-impact printers, laser printers, thermal printers, ink-jet printers and the like, of which ink-jet printers and ink-jet plotters are most widely employed because these machines have advantages that printing-out can be performed with little machine noise, printing-out in full color can be performed therewith and the running cost for printing out is low.

The paper sheet used in printing in an ink-jet printer or ink-jet plotter can be a sheet of plain paper or coated paper but, besides, a recording sheet which is a plastic film provided with an ink-receptive layer on at least one surface of a substrate can also be used. Recording sheets of this type are widely used in the preparation of posters having colored images because the printed material obtained by printing out on such a recording sheet is excellent in the gloss of the surface. The paper size required in such printing is increasing to reach the A3 to A0 size to exceed the A4 size most widely used in the preparation of general documents.

Various coating compositions have been proposed heretofore for forming such an ink-receptive layer on a substrate to prepare an ink-jet recording sheet. For example, Japanese Patent Publication 6-427 proposes a coating composition comprising a polyvinyl alcohol and polyvinylpyrrolidone. Japanese Patent Kokai 7-40646 discloses a double-coated ink-jet recording sheet of which the undercoating layer contains a polyvinylpyrrolidone and the overcoating layer contains a polyvinyl alcohol. Due to the hydrophilicity of these polymers, however, the ink-receptive layer has low water-resistance so that use of the recording sheets outdoors or under a highly humid atmosphere is limited along with a disadvantage of blocking of the sheets stacked one on the other.

Various proposals have been made with an object to overcome the above described problems and disadvantages of the ink-jet recording sheets in the prior art. For example, Japanese Patent Kokai 61-188183 discloses an ink-jet recording sheet having an overall linear transmittance of at least 30%, of which the ink-receptive layer contains from 5 to 50% by weight of colloidal silica particles having a particle diameter not exceeding 80 nm. Japanese Patent Kokai 63-178173 proposes a substrate of an ink-jet recording sheet which is a film of a polyvinyl alcohol modified with acetoacetyl groups and admixed with an organic adjuvant compound selected from aldehyde compounds, amine compounds and epoxy compounds.

The above described ink-jet recording sheets have respective defects in several respects. Namely, the ink-receptive layer containing colloidal silica particles is defective in the low water resistance because the resinous ingredient forming the ink-receptive layer is a water-soluble resin such as polyvinyl alcohol and polyvinylpyrrolidone. The ink-jet recording sheet having an ink-receptive layer based on a substrate of an acetoacetyl-modified polyvinyl alcohol containing an organic adjuvant compound is defective because of the low ink receptivity as well as poor pattern reproducibility and color development.

SUMMARY OF THE INVENTION

The primary object of the present invention accordingly is, by overcoming the above described problems and disadvantages in the prior art, to provide an ink-jet recording sheet of which the ink-receptive layer is highly water-resistant and excellently transparent, exhibits good ink absorption and color development and is free from tackiness on the surface not to cause blocking of the sheets.

The above mentioned ink-receptive layer as desired is obtained by using a liquid coating composition which comprises, as a uniform blend in an aqueous medium, which is water or a mixture of water and ethyl alcohol:

(A) an acetoacetylated polyvinyl alcohol;
(B) a polyvinylpyrrolidone resin; and
(C) an acidic aqueous dispersion of a colloidal silica, of which the weight proportion of the component (A) to component (C) is in the range from 9:1 to 6:4 on a solid basis and the weight proportion of the total amount of the component (A) and component (C) to component (B) is in the range from 9:1 to 6:4 on a solid basis.

Accordingly, the ink-jet recording sheet of the invention is a web material comprising:

(1) a substrate film; and
(2) an ink-receptive coating layer on at least one surface of the substrate film formed from the above defined liquid coating composition.

The above defined ink-jet recording sheet of the invention optionally further comprises:

(3) an overcoating layer having permeability to an ink as formed from a coating composition comprising a hydrophilic resin and a surface roughening agent.

DETAILED DESCRIPTION OF THE PREFERRED EMBODIMENTS

The liquid coating composition of the present invention for forming the ink-receptive layer of the ink-jet recording sheet contains, as a film-forming resinous ingredient, an acetoacetylated polyvinyl alcohol resin as the component (A), which preferably has a degree of polymerization in the range from 500 to 2500 or, more preferably, from 1000 to 2000 in view of the balance of various properties of the coating composition and the ink-receptive layer formed therefrom. When the degree of polymerization of the resin is too low, the ink-receptive layer formed from the coating composition is poor in fixing of the ink and in the water resistance while, when the degree of polymerization thereof is too high, the liquid coating composition has an unduly high viscosity and the water resistance of the ink-receptive layer is too high to exhibit good ink absorption. The degree of saponification of the acetoacetylated polyvinyl alcohol resin is in the range from 75 to 99% or, preferably, from 85 to 95% in order to exhibit adequate ink absorptivity. When the degree of saponification is too low, sufficient ink absorption can not be obtained. The degree of substitution of the polyvinyl alcohol resin by the acetoacetyl groups is in the range from 1 to 20% or, preferably, from 2 to 10% relative to the overall monomeric units of the polymer. When the degree of substitution is too low, the ink-receptive layer formed from the coating composition cannot be imparted with fully improved water resistance while, when the degree of substitution is too high, the water resistance of the ink-receptive layer is too high to exhibit good ink absorption.

The acetoacetylated polyvinyl alcohol resin can be prepared by a variety of procedures without particular limitations. For example, a completely or partially saponified polyvinyl alcohol is subjected to an addition reaction with diketene. Alternatively, a partially saponified polyvinyl alcohol is subjected to an ester exchange reaction with an acetoacetic acid ester.

The component (B) in the inventive liquid coating composition is a polyvinylpyrrolidone resin having a weight-average molecular weight of at least 40,000 or, preferably, in the range from 600,000 to 2,800,000. When the molecular weight of the polyvinylpyrrolidone resin is too low, the ink-receptive layer formed from the coating composition containing the same would be poor in fixing of the ink.

The component (C) in the inventive liquid coating composition is a colloidal silica in the form of an acidic aqueous dispersion which is prepared by using an acidic silica sol having stability at a pH of 2 to 6. Such a silica sol should be stable by electric repulsion between silica particles in an acidic dispersion medium such as water acidified with hydrochloric acid to have a pH of 2 to 6 without substantial decrease in the zeta-potential of the colloidal silica particles. Commercial products of several grades, which can be used as such in the present invention, are available for such an acidic colloidal silica dispersion including, for example, Snowtexes O and AK (each a product by Nissan Chemical Co.), Catalloid SN (a product by Shokubai Kasei Co.) and Adelite AT 20Q (a product by Asahi Denka Kogyo Co.).

The above described components (A), i.e. acetoacetylated polyvinyl alcohol resin, and the component (C), i.e. acidic colloidal silica dispersion, as two of the essential ingredients are compounded in such a specific proportion that the weight ratio of the component (A) to the component (C) is in the range from 9:1 to 6:4 or, preferably, from 9:1 to 7:3 on a solid basis. When the amount of the component (C) is too large, the water resistance of the ink-receptive layer formed from the coating composition is too high to exhibit adequate absorption of the ink while, when the amount of the component (C) is too small, the ink-receptive layer would be insufficiently water-resistant.

The polyvinylpyrrolidone resin as the component (B) is compounded in the inventive liquid coating composition in such an amount that the weight proportion of the total amount of the components (A) and (C) to the amount of the component (B) is in the range from 9:1 to 6:4 on a solid basis. When the amount of the component (B) is too small, the ink-receptive layer exhibits poor absorption of the ink while, when the amount thereof is too large, a decrease is caused in the water resistance of the ink-receptive layer.

The liquid coating composition of the invention is prepared by dissolving or dispersing, in an aqueous medium, the above described essential ingredients, i.e. components (A), (B) and (C), each in an amount to satisfy the above mentioned requirements for the weight proportion in such an overall amount that the solid content of the coating composition is in the range from 5 to 25% by weight or, preferably, from 10 to 15% by weight. In addition to these essential ingredients, the liquid coating composition of the invention can be admixed with various kinds of known additives each in a limited amount including surface active agents, lubricants, stabilizers and coloring agents.

The ink-jet recording sheet of the present invention is prepared by coating at least one surface of a substrate web with the above described liquid coating composition followed by drying to form an ink-receptive layer. The substrate web used here is not particularly limitative and various kinds of web materials used as a substrate of conventional ink-jet recording sheets can be used including cellulosic paper sheets, synthetic paper sheets and plastic films. Plastic films are advantageous when transparency is desired for the ink-jet recording sheet to employ the sheet bearing the recorded images as a transparency on an overhead projector. Examples of the plastic resin suitable as the material of the plastic film include polyethylene terephthalate resins, polyethylenes, polypropylenes and polyamide resins without particular limitations. The plastic film can be transparent, translucent or opaque with admixture of an appropriate amount of a pigment depending on the intended application of the ink-jet recording sheet. The substrate web has a thickness in the range, usually, from 25 to 250 $\mu$m or, in most cases, from 50 to 150 $\mu$m.

If desired in order to improve the adhesion between the substrate surface and the ink-receptive layer thereon, it is optional to subject the substrate surface to a treatment having a priming effect such as a corona discharge treatment, ozone treatment and plasma treatment as well as to a coating treatment to form an undercoating layer of a saturated polyester resin or urethane resin having a thickness in the range, for example, from 0.5 to 5 $\mu$m.

The ink-receptive layer on the substrate surface can be formed according to a conventional procedure by coating the surface with the above described liquid coating composition followed by drying. The ink-receptive layer has a thickness in the range, usually, from 5 to 30 $\mu$m or, preferably, from 10 to 20 $\mu$m.

It is optional according to need that the ink-jet recording sheet prepared in the above described manner is provided, on the ink-receptive layer, with an overcoating layer having permeability to the water-base ink by coating with a coating composition containing a hydrophilic resin and a surface roughening agent.

The hydrophilic resin used in the overcoating composition is exemplified by polyvinyl alcohol resins, polyvinylpyrrolidone resins and acrylic resins of the quaternary ammonium salt type, which can be used either singly or as a combination of two kinds or more according to need. The surface roughening agent in the overcoating composition is a powder selected from various kinds of inorganic and organic materials including synthetic silica, zirconia, clay, kaolin, alumina, titanium dioxide, zeolites, calcium carbonate, barium sulfate, magnesium hydroxide, calcium phosphate and glass as the examples of the inorganic materials and acrylic resins, urethane resins, polyvinyl chloride resins, benzoguanamine resins and polycondensation resins of benzoguanamine, melamine and formaldehyde as the examples of the organic materials, which can be used either singly or as a combination of two kinds or more according to need. The amount of the surface roughening agent in the overcoating composition is in the range from 0.5 to 10 parts by weight per 100 parts by weight of the hydrophilic resin.

The overcoating composition is prepared by dissolving and dispersing the hydrophilic resin and the surface roughening agent in an aqueous medium. It is optional that the overcoating composition is admixed with various kinds of known additives each in a limited amount including surface active agents, lubricants, stabilizers and coloring agents.

The overcoating layer is formed according to a conventional procedure by coating the ink-receptive layer with the thus prepared overcoating composition, for example, by using a wire bar coater followed by drying. The thickness of the overcoating layer, when formed, is in the range, usually, from 0.1 to 10 μm or, preferably, from 0.5 to 5 μm.

When the inventive ink-jet recording sheet has the ink-receptive layer only on one of the substrate surfaces, it is optional according to need that the other substrate surface is provided with a curling-preventing layer or matting layer consisting of a binder resin and a surface roughening agent to decrease the luster of the surface. The formulation of the coating composition for the curling-preventing layer can be similar to that for the ink-receptive layer, optionally, with admixture of a surface roughening agent having a relatively large particle diameter. The surface roughening agent contained in the matting layer can be selected from those named above as the examples of the surface roughening agent in the overcoating layer on the ink-receptive layer. The binder resin in the matting layer, on the other hand, can be selected from thermoplastic resins, thermosetting resins and photo-curable resins including, for example, acrylic resins, urethane-based resins, polyester-based resins and vinyl chloride-based resins. The thickness of the curling-preventing layer or the matting layer is usually in the range from 1 to 10 μm though dependent on the thickness of the ink-receptive layer.

In the following, the present invention is described in more detail by way of Examples, which, however, never limit the scope of the invention in any way. The ink-jet recording sheets prepared in the Examples were evaluated for the following items by the respective testing procedures described there. The term of "parts" in the following description always refers to "parts by weight".

(1) Water resistance

The ink-jet recording sheet was printed on a bubble jet printer (Model BJC 400J, manufactured by Canon Co.) with an ink (BCI 21, a product by Canon Co.) and then subjected to the following tests for removal of the ink by rubbing either before or after dipping in water.

(1a) Wet rubbing test before dipping in water

The printed surface of the ink-jet recording sheet was rubbed by hand with adsorbent cotton soaked with water and the number of rubbing taken for removal of the ink was recorded.

(1b) Rubbing after dipping in water

The printed recording sheet after dipping in water for 2 seconds was gently rubbed 10 times by hand with dry adsorbent cotton and recording was made for the extent of removal of the ink in three ratings A, B and C according to the following criteria.

A: no noticeable decrease in the density of ink in the printed areas

B: incomplete removal of ink but almost unrecognizable inked pattern left

C: complete removal of ink (2) Transparency

The ink-jet recording sheet before printing was subjected to the measurement of the haze value according to the procedure specified in JIS K 6714 and the results were recorded in two ratings of A and B according to the following criteria.

A: lower than 5% of haze value

B: 5% or higher of haze value (3) Color reproducibility

The ink-jet recording sheet printed in the same manner as in (1) above was visually inspected to record the results of color reproduction in three ratings of A, B and C according to the following criteria.

A: Printed pattern of each color was sharply reproduced without blur.

B: Printed pattern of each color was sharp though with slight blur.

C: No sharp pattern was obtained for each color with heavy blur.

(4) Ink drying

Testing of ink drying was conducted in two ways below.

(4a) The ink-jet recording sheet printed in the same manner as in (1) above was inspected by finger touch for the ink condition of drying to record the results in three ratings of A, B and C for the tack-free drying time of less than 60 seconds, 60 seconds to 180 seconds and more than 180 seconds, respectively.

(4b) The ink-jet recording sheet printed in substantially the same manner as in (1) above excepting use of an ink-jet plotter (Model Design Jet 750C, manufactured by Hewlett Packard Co.) in place of the bubble jet printer was inspected by finger touch for the ink condition of drying to record the results in four ratings of A, B, C and D for the tack-free drying time of less than 10 seconds, 10 seconds to 60 seconds, 60 seconds to 180 seconds and more than 180 seconds, respectively.

(5) Blocking resistance

Two ink-jet recording sheets were laid one on the other with the ink-receptive layer of the first sheet and the uncoated surface of the second sheet in direct contact each with the other and kept under a pressing load of 100 g/cm$^2$ for 24 hours in an atmosphere of 80% relative humidity at 50° C. followed by peeling by hand to record the condition of blocking in three ratings of A, B and C according to the following criteria.

A: absolutely no blocking

B: partial blocking

C: blocking allover

EXAMPLE 1

A liquid coating composition for an ink-receptive layer was prepared by mixing 6.4 parts of an acetoacetylated polyvinyl alcohol having a degree of polymerization of 1000 and degree of saponification of 99%, of which the degree of acetoacetylation was 5% of the monomeric units (Gohsefimer Z200, a product by Nippon Gohsei Kagaku Kogyo Co.), 2 parts of a polyvinylpyrrolidone resin having a weight-average molecular weight of 630,000 (PVP-K90, a product by GAF Co.), 8 parts of an acidic aqueous colloidal silica dispersion of pH 4.9 containing 20% of solid matter (Snowtex ST-AK, a product by Nissan Chemical Co.), 10 parts of ethyl alcohol and 73.6 parts of water.

A polyethylene terephthalate film of 100 μm thickness provided on one surface with a primer layer of a urethane resin of 1 μm thickness was coated on the primed surface with the above prepared liquid coating composition by using a wire bar coater followed by drying at 130° C. for 5 minutes to form a 10 μm thick ink-receptive layer of an ink-jet recording sheet. The results of the evaluation tests of this ink-jet recording sheet are shown in the Table given below.

EXAMPLE 2

The ink-jet recording sheet prepared in Example 1 was further coated on the ink-receptive layer with an overcoating composition prepared by dissolving or dispersing 3.2 parts of a polyvinyl alcohol having a degree of polymerization of 1700 and a degree of saponification of 88% (Gohsenol GH-17, a product by Nippon Gohsei Kagaku Kogyo Co.), 0.8 part of the same polyvinylpyrrolidone resin as used in Example 1 and 0.1 part of a synthetic silica powder having an average particle diameter of 6 μm in 95.9 parts of water by using a wire bar coater followed by drying at 130° C. for 5 minutes to form an ink-permeating overcoating layer of 1 μm thickness. The results of the evaluation tests of the thus prepared overcoated ink-jet recording sheet are shown in the Table given below.

EXAMPLE 3

The experimental procedure was substantially the same as in Example 1 described above except that the liquid coating composition for the ink-receptive layer was prepared from 4.8 parts of the same acetoacetylated polyvinyl alcohol, 4 parts of the same polyvinylpyrrolidone resin, 6 parts of the same acidic aqueous colloidal silica dispersion, 10 parts of ethyl alcohol and 75.2 parts of water. The results of the evaluation tests of the ink-jet recording sheet are shown in the Table given below.

EXAMPLE 4

The experimental procedure was substantially the same as in Example 3 described above except that the ink-jet recording sheet prepared in Example 3 was further overcoated with the same overcoating composition as prepared and used in Example 2 in the same manner as in Example 2. The results of the evaluation tests of the ink-jet recording sheet are shown in the Table given below.

COMPARATIVE EXAMPLE 1

The experimental procedure was substantially the same as in Example 1 described above excepting for the replacement of the acetoacetylated polyvinyl alcohol with the same amount of the same polyvinyl alcohol as used in the overcoating composition prepared in Example 2. The results of the evaluation tests of the ink-jet recording sheet are shown in the Table given below.

COMPARATIVE EXAMPLE 2

The experimental procedure was substantially the same as in Example 1 described above excepting for the replacement of the acidic aqueous colloidal silica dispersion with the same amount of another aqueous colloidal silica dispersion of pH 8.6 containing 20% by weight of solid matter (Snowtex ST-C, a product by Nissan Chemical Co.). The results of the evaluation tests of the ink-jet recording sheet are shown in the Table given below.

COMPARATIVE EXAMPLE 3

The experimental procedure was substantially the same as in Example 1 described above excepting for the omission of the polyvinylpyrrolidone resin and, instead, increase of the amount of water from 73.6 parts to 75.6 parts in the preparation of the coating composition. The results of the evaluation tests of the ink-jet recording sheet are shown in the Table given below.

COMPARATIVE EXAMPLE 4

The experimental procedure was substantially the same as in Example 1 described above excepting for the omission of the acidic aqueous colloidal silica dispersion and, instead, increase of the amount of water from 73.6 parts to 81.6 parts in the preparation of the coating composition. The results of the evaluation tests of the ink-jet recording sheet are shown in the Table given below.

COMPARATIVE EXAMPLE 5

The experimental procedure was substantially the same as in Example 1 described above except that the liquid coating composition for the ink-receptive layer was prepared from 4 parts of the same acetoacetylated polyvinyl alcohol, 5 parts of the same polyvinylpyrrolidone resin, 5 parts of the same acidic aqueous colloidal silica dispersion, 10 parts of ethyl alcohol and 76 parts of water. The results of the evaluation tests of the ink-jet recording sheet are shown in the Table given below.

COMPARATIVE EXAMPLE 6

The experimental procedure was substantially the same as in Example 1 described above except that the liquid coating composition for the ink-receptive layer was prepared from 3.2 parts of the same acetoacetylated polyvinyl alcohol, 2 parts of the same polyvinylpyrrolidone resin, 24 parts of the same acidic aqueous colloidal silica dispersion, 10 parts of ethyl alcohol and 60.8 parts of water. The results of the evaluation tests of the ink-jet recording sheet are shown in the Table given below.

TABLE

| | | Water resistance (1a) | Water resistance (1b) | Trans- parency | Color repro- duc- ibility | Ink drying (4a) | Ink drying (4b) | Block- ing resist- ance |
|---|---|---|---|---|---|---|---|---|
| Example | 1 | 100< | A | A | A | A | B | A |
| | 2 | 100< | A | A | A | A | B | A |
| | 3 | 100≦ | A | A | A | A | A | A |
| | 4 | 100≦ | A | A | A | A | A | A |
| Compara- | 1 | 35 | B | A | A | A | C | B |
| tive | 2 | 5 | C | A | A | A | C | B |
| Example | 3 | 100< | B | A | C | C | D | A |
| | 4 | 6 | C | A | A | A | C | C |
| | 5 | 50 | A | A | B | A | B | B |
| | 6 | 100< | A | A | B | B | D | A |

What is claimed is:

1. An ink-jet recording sheet in the form of a web material which comprises:
   (1) a substrate; and
   (2) an ink-receptive coating layer on at least one surface of the substrate formed by coating with a liquid coating composition comprising, as a uniform blend in an aqueous medium:
   (A) an acetoacetylated polyvinyl alcohol;
   (B) a polyvinylpyrrolidone resin; and
   (C) an acidic aqueous dispersion of a colloidal silica, of which the weight proportion of the component (A) to component (C) is in the range from 9:1 to 6:4 on a solid basis and the weight proportion of the total amount of the component (A) and component (C) to component (B) is in the range from 9:1 to 6:4 on a solid basis.

2. The ink-jet recording sheet as claimed in claim 1 in which the substrate is a paper sheet or a film of a plastic resin.

3. The ink-jet recording sheet as claimed in claim 1 in which the ink-receptive coating layer has a thickness in the range from 5 to 30 μm.

4. The ink-jet recording sheet as claimed in claim 1 which further comprises:
   (3) an overcoating layer having permeability to an aqueous ink formed on the ink-receptive layer by coating with a coating composition comprising a hydrophilic resin and a surface roughening agent.

5. The ink-jet recording sheet as claimed in claim 4 in which the hydrophilic resin is polyvinyl alcohol.

6. The ink-jet recording sheet as claimed in claim 4 in which the surface roughening agent is a powder of silica.

7. The ink-jet recording sheet as claimed in claim 4 in which the amount of the surface roughening agent is in the range from 0.5 to 10 parts by weight per 100 parts by weight of the hydrophilic resin.

8. The ink-jet recording sheet as claimed in claim 4 in which the overcoating layer having permeability to an aqueous ink has a thickness in the range from 0.1 to 10 $\mu$m.

* * * * *